US005647635A

United States Patent [19]
Aumond et al.

[11] Patent Number: 5,647,635
[45] Date of Patent: Jul. 15, 1997

[54] CAR SEAT WITH AN ADJUSTABLE SURFACE AREA

[75] Inventors: Jean-Claude Aumond, Etrechy; Christophe Aufrere, Marcoussis, both of France

[73] Assignee: Bertrand Faure Equipements S.A., Boulogne, France

[21] Appl. No.: 642,190

[22] Filed: May 6, 1996

[30] Foreign Application Priority Data

May 30, 1995 [FR] France .................. 95 06666

[51] Int. Cl.⁶ .................................................. A47C 7/14
[52] U.S. Cl. .......................... 297/284.11; 297/284.1
[58] Field of Search .................... 297/284.11, 284.1, 297/313, 337

[56] References Cited

U.S. PATENT DOCUMENTS

| | | | |
|---|---|---|---|
| 3,632,166 | 1/1972 | Lohr | 297/284.1 |
| 4,324,431 | 4/1982 | Murphy et al. | 297/284.11 |
| 4,334,709 | 6/1982 | Akiyama et al. | 297/284.11 |
| 4,558,903 | 12/1985 | Takagi | 297/284.11 X |
| 4,717,203 | 1/1988 | Meiller | 297/284.11 |
| 4,767,155 | 8/1988 | Kousaka et al. | 297/284.11 X |
| 5,340,185 | 8/1994 | Vollmer | 297/284.11 X |

FOREIGN PATENT DOCUMENTS

| | | |
|---|---|---|
| 2694172 | 2/1994 | France . |
| 2027646 | 6/1969 | Germany . |
| 2028135 | 2/1971 | Germany . |
| 3244584 | 6/1984 | Germany . |
| 4114735 | 11/1992 | Germany . |
| 4229695 | 3/1994 | Germany . |

*Primary Examiner*—Peter M. Cuomo
*Assistant Examiner*—Rodney B. White
*Attorney, Agent, or Firm*—Pollock, Vande Sande & Priddy

[57] ABSTRACT

The seat comprises several swivelling pins parallel with each other and about which the seat nose pivots successively from a given position to a following one, while the seat nose has the general shape of a polygon, the successive sides of which have increasing lengths. The position of said pins in relation to said sides is such that the seat nose surface facing upwards in each one of said positions is substantially in prolongation of the top surface of the cushion and in close proximity to it.

9 Claims, 5 Drawing Sheets

CAR SEAT WITH AN ADJUSTABLE SURFACE AREA

FIELD OF THE INVENTION present invention relates to the field of seats for motor vehicles and more particularly to a seat with an adjustable surface area, so as to adapt the depth of the seat, that is its dimension between the back and the front edge of the seat surface, to the user's morphology.

BACKGROUND OF THE INVENTION

Such seats are already known, in particular as disclosed in FR-A-2694172, in which the nose of the seat i.e. its front edge consists of a movable part compared with the cushion, forming the main part of the seat surface. This movable part is mounted pivotally about a transverse axis at the front part of the seam frame. Its top surface is curved, exhibiting a profile in the shape of an arc of a circle, having said axis as a center, and it cooperates with the front edge of the cushion, having a concave underside with the same profile. On swivelling, the seat nose can retract in part under the cushion, which confers a variable depth upon the seat, while providing some continuity between the top surface of said cushion and the curved nose surface in the various positions of the latter.

A drawback of this system lies in the fact that such continuity means that the top surface of the cushion must be nearly tangent to the curved nose surface. As a result, the front edge of the cushion has the shape of a quite tapered peak in section, which is a real problem as regards the stuffing and the keeping in shape of this peak, which must still be compliant enough not to be prejudicial to the user's comfort. In addition, the user may find it difficult to operate the seat nose forwards so as to move it from a retracted position to an extended position.

BRIEF DESCRIPTION OF THE INVENTION

It is the object of the present invention to solve such problems and more particularly to provide a seat with a seat surface easily adjustable in depth by the swivelling of the seat nose, without requiring further control means, and having a satisfactory continuous appearance as regards the stuffing of both the nose and the cushion, whatever the adjusting position may be, and yet without interfering with either the manufacturability or the comfort of the cushion.

For accomplishing the above-mentioned objects, the seat according to the invention is characterized in that it comprises several swivel axis parallel with each other and about which the seat nose pivots successively from a given position to a following one, and the seat nose has, in section perpendicularly to said axis, the general shape of a polygon, the successive sides of which have increasing lengths, the position of said axis in relation to said sides being such that the seat nose surface facing upwards is substantially in prolongation of the top surface of the cushion and in close proximity to it, in each one of said positions.

Thanks to the separate swivel axis, the seat nose can have a cross section in the shape of a polygon every face of which, constituting the nose surface which is above in every position, has a profile suitable for providing the appearance continuity with the top surface of the cushion. More specifically, in comparison with the above-mentioned prior art, there is no need for the nose surface to be cylindrical and therefore the lower front face of the cushion can form, together with its top surface, a wider angle for a better strength of the front part of the cushion and an easier production of this front part.

As a matter of fact, the shape of the seat nose and the respective positions of said axis must comply with several conditions so as to permit the changeover from any given adjusting position to another one, while keeping the required appearance continuity between the cushion and the nose in each one of said positions. On the one hand, the axis of rotation used to change from an adjusting position to the following one must be substantially equidistant from the edges of the face facing upwards in the first one of these positions, so as to permit the changeover from one position to another one without interfering with the front edge of the cushion, while maintaining the contact between this front edge and the seat nose in every position. On the other hand, for the user's comfort in every position, the seat nose face facing forwards must be inclined enough, with regard to the face situated above, so as not to be in the way of the user's legs. To this end, a maximum angle of 110° will be preferably selected between two adjacent faces.

According to a particular arrangement, the seat nose has a quadrilateral section and the seat comprises a first swivel axis about which the seat nose swivels between a first position and a second position, and a second swivel axis about which the nose swivels between said second position and a third position.

According to a first alternative embodiment, both swivel axis are fixed in relation to the seat nose and movable in relation to the seat, during the successive swivelling motions of the nose.

According to another alternative embodiment, the first axis is stationary in relation to the seat nose and the second axis is stationary in relation to the seat.

According to other particular arrangements:

The seat comprises locking/unlocking means for automatically locking the seat nose in every one of its adjusting positions, the unlocking operation being carried out automatically by a further swivelling motion beyond the latest adjusting position and permitting the seat nose to be returned to its first position.

Said locking/unlocking means comprise a bistable system affording, in a first stable position, the locking of the seat nose in the adjusting position which is moved to a second stable position for cancelling said locking, at the time of said further motion.

Said bistable system comprises means for its automatic return to its first stable position when the seat nose resumes its first adjusting position.

BRIEF DESCRIPTION OF THE FIGURES

Other features and advantages of the present invention will become more apparent upon reading the following exemplary detailed description of two alternative embodiments of a seat according to the invention, taken in conjunction with the accompanying drawings, wherein.

DETAILED DESCRIPTION OF THE INVENTION

Figure 1:
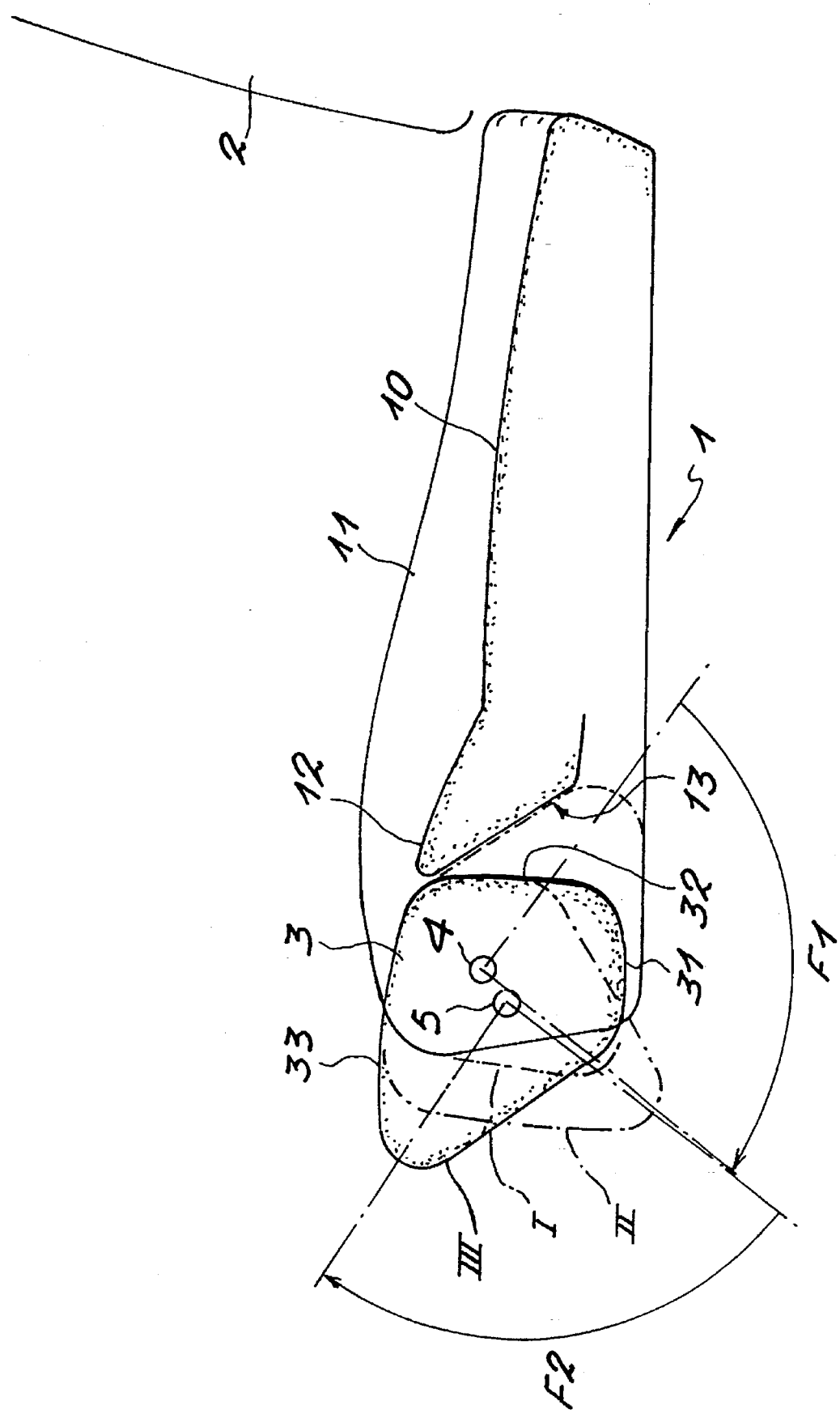
FIG. 1 is a sectional view of the seat surface, showing the various adjusting positions of the seat nose.

The car seat shown in FIG. 1 is conventionally composed of a seat surface 1 and of a back 2, only partly shown. The seat surface 1 comprises a cushion 10 in the middle and two side edges 11. At the front part of the seat, the cushion 10 ends in a kind of peak 12, recessed in relation to the front ends of edges 11. An adjustable seat nose 3 is placed ahead of the peak 12, at least partly between the edges 11.

The seat nose 3 is in the general shape of a prism, with a four-sided polygonal section, substantially trapeziform in the example. The seat nose 3 is mounted pivotally on the frame, not shown, of the seat 1, the swivelling motion taking place about two horizontal parallel pins 4, 5 to be further described hereunder. The positions of these pins is set in such a way that, in every one of the three possible adjusting positions, indicated by reference marks I, II and III respectively, the face of the seat nose which is facing upwards is substantially in prolongation of the upper surface of the peak 12 and in contact with it.

In the example shown, the seat nose section is in the general shape of a rectangular trapezium. Three successive faces 31, 32, 33 (in the trigonometrical direction in the figures) have increasing widths so that, when these faces are successively brought to the upper position, through a swivelling motion of the nose, they extend the cushion 10 by a variable length at the front part, thus enabling the user to adjust his seat's depth. In position I, the narrowest face 31 is facing upwards, resulting in the minimum seat depth. On swivelling about pin 4, as indicated by arrow F1, the medium width face 32 is brought to the upper position, resulting in a medium seat depth and, and a second rotation about pin 5, as shown by arrow F2, brings the widest face 33 to the upper position, providing the maximum seat depth (position III in continuous lines in FIG. 1).

FIGS. 2a–2d show a first alternative embodiment of the mechanism permitting the seat nose to be maintained in the above-mentioned various positions and to change over.

Such mechanism comprises a link 41 integral with the seat nose 3 and bearing both swivel pins 4 and 5. The pin 4 is substantially equidistant from the rounded corners 35 and 36 of the nose 3, constituting the edges of the narrowest face 31. Thus, when the seat nose is in position I, the corner 35 is substantially in contact with the tip of peak 12 and, when the nose has rotated about pin 4, the corner 36 is brought into the same contacting position (see FIG. 2b), resulting in the continuity of the top surface of the seat between the cushion 10 and the seat nose.

In addition, preferably the pin 4 is substantially equidistant from both faces 31 and 32, thus providing an identical height positioning of the nose face located above in both adjusting positions I and II. Yet, the distances between the pin 4 and the faces 31 and 32 could be slightly different, permitting for instance, slightly different inclinations of the face facing upwards, according to the adjusting position selected.

Similarly, pin 5 serving as an axis of rotation for the changeover from position II to position III is substantially equidistant from the corners 36 and 37, forming the edges of the medium width face 32, and equidistant from the faces 32 and 33 too.

An open bearing 19, integral with the seat frame, receives, in positions I and II of the nose, the pin 4 and a tension spring 61 connects pin 4 to an anchoring point 14, stationary on the seat frame and it exerts, on this pin 4, an upward restoring force, tending to keep it in the bearing 19.

The pin 5 enters a slot 17 in the shape of an arc of a circle, provided in the seat frame and the center of curvature of which is the position of pin 4, when the seat nose is in position I. A second return spring 62 is mounted between pin 5 and an anchoring point 15, stationary on the seat and it exerts on said pin 5 a restoring force, substantially horizontal and directed towards the back part of the seat, tending to keep or to return pin 5 to the rear end of slot 17.

A bistable locking/unlocking system comprises a cam 7, in the general shape of a U, mounted on the seat frame, below the slot 17 and pivoting about pin 18 between two stable end positions, in which the cam can be maintained by means of a bistable spring 63. The omega-shaped spring 63 has an end 16 linked to the seat frame, whereas its other end 72 is linked to the cam 7. The leg of said U, forming the cam 7, located toward the front part of the seat, builds a hook 71 facing upwards and the tip of which faces, in a first stable position of cam 7, the slot 17 while, in the second stable position of the cam, it is released under said slot. Inside the U, forming the cam 7, there is provided a notch 73, between said hook 71 and a boss 74, and the dimensions of which are suitable for receiving pin 4.

Therefore, whatever the position of said nose may be, the nose 3 is kept on the seat 1, on the one hand by pin 5 engaging the slot 17 and pin 4 engaging either the open bearing 19 or the notch 73 and, on the other hand by the action of springs 61 and 62, which exert on the nose restoring forces, respectively upwards and towards the seat cushion. It should be observed that such restoring forces also generate respective restoring moments about both pins 4 and 5, permitting, as will be explained, the automatic return of the nose to its first position I after unlocking. Of course, the tension springs 61 and 62 might be replaced by other resilient restoring means with the same functions, for example, torsion springs.

With reference to FIGS. 2a–2d, the operation and the implementation of the mechanism will be explained. It should be noted that the changeover to the successive positions I, II and III is carried out, without requiring auxiliary control means, merely by turning the seat nose by hand, while pulling it in the direction of arrows F1, F2.

Figure 2A:
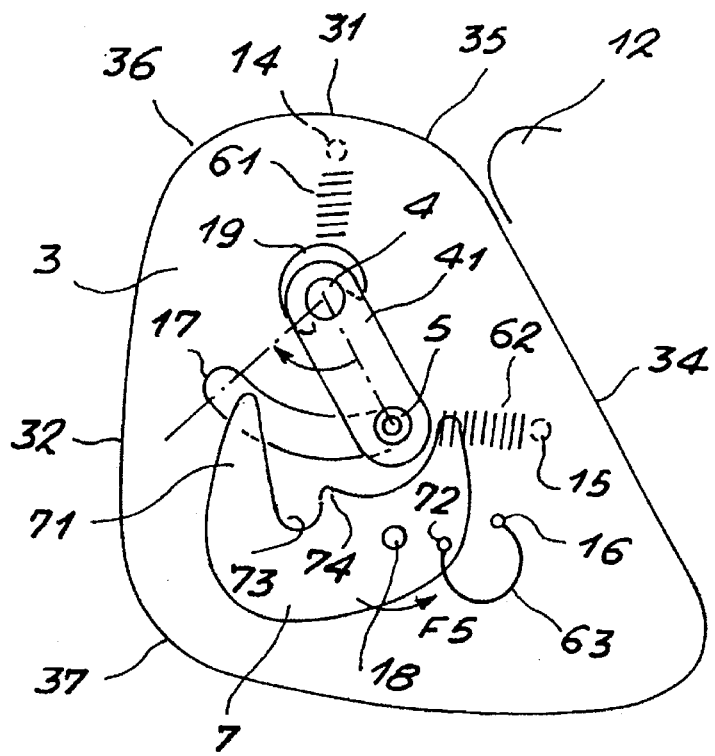
FIGS. 2a–2d schematically show a first alternative embodiment of the adjusting and locking mechanism, in the three adjusting positions of the seat nose.
Figure 2B:
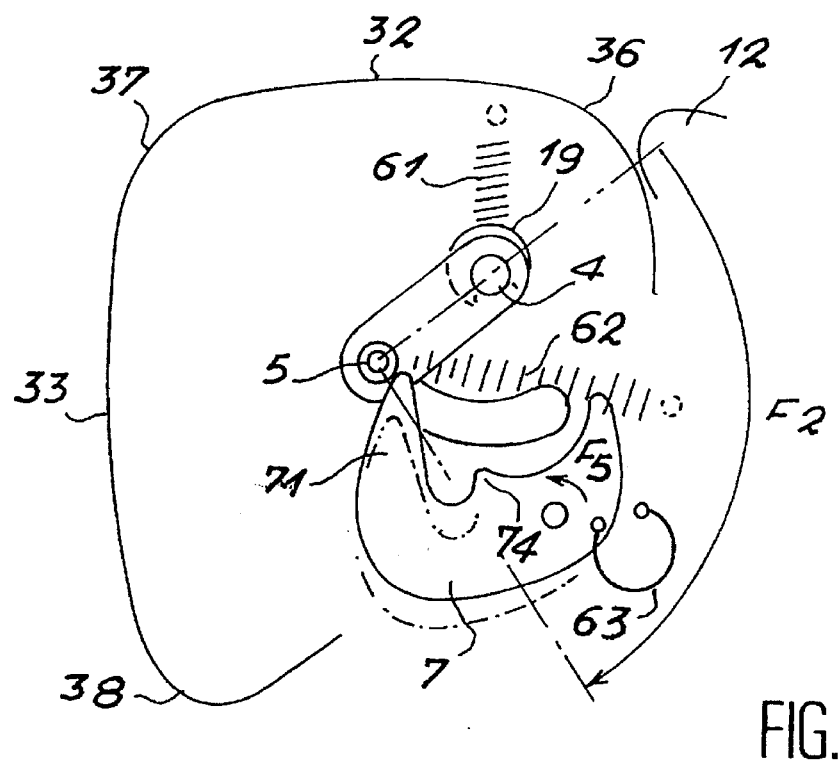
Figure 2C:
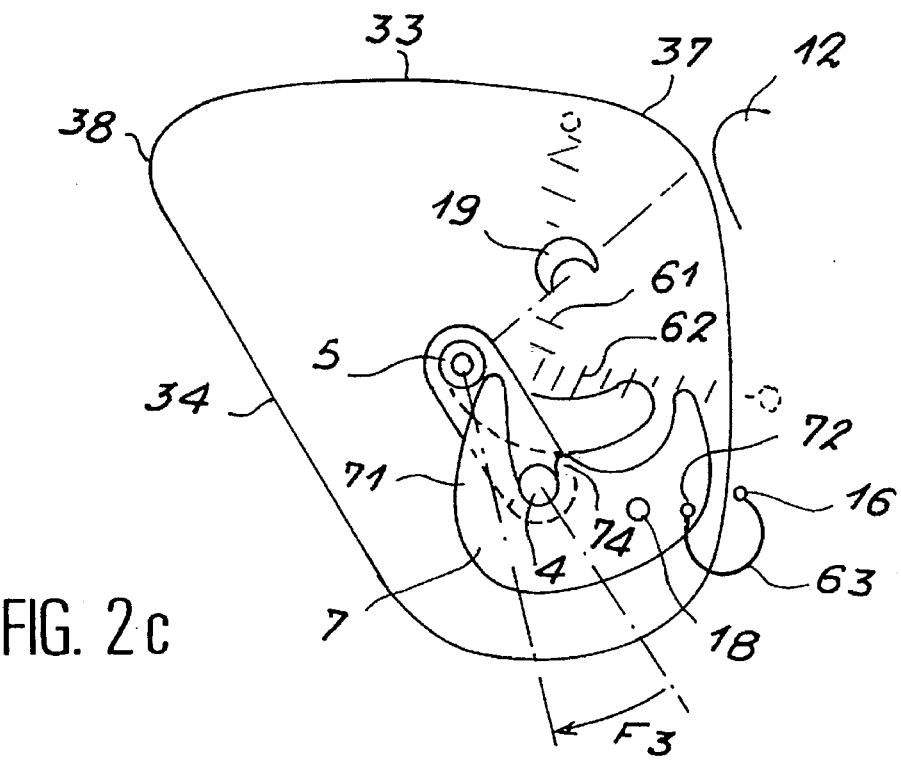
Figure 2D:
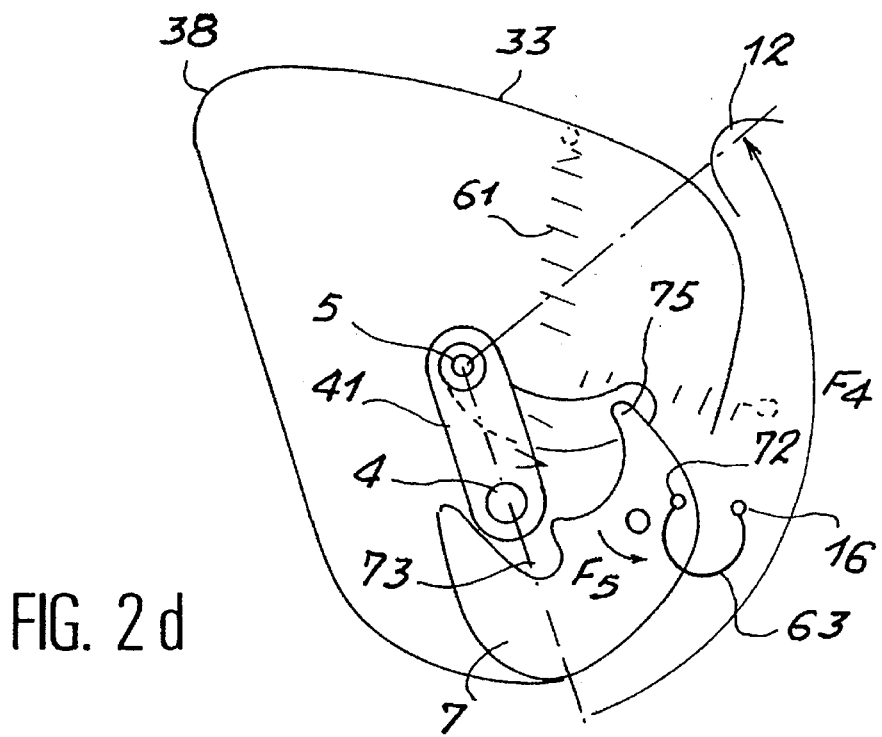

When the seat nose is in position I, shown in FIG. 2a and corresponding the minimum seat depth, pin 4 engages with the open bearing 19 and is maintained in it under the action of spring 61. Pin 5 is maintained on the rear end of slot 17, under the action of spring 62. In this position, the fourth nose face 34 is practically in contact with the lower face 13 of the peak 12 of the seat cushion 10.

If the user seizes, for instance, the corner 37 of the seat nose and pulls it upwards, he causes the nose to pivot about pin 4, kept in position in the bearing 19, in the direction of arrow F1. Pin 5 moves to the front part of the slot 17, against spring 62 and, as it touches the hook 71 of the cam 7, it causes the latter to pivot slightly in the direction of arrow F5, against spring 63, yet without causing the cam 7 to rock to its second stable position. When the pin 5 comes to a stop on the front end of the slot 17, the spring 63 brings the cam 7 back to its initial position, the tip of the hook 71 locks the pin 5 (FIG. 2b) thus providing the locking of the nose in its position II for a medium seat depth.

From this position, a second pivoting action, for instance by pulling the corner 38 upwards, causes the nose 3 to pivot about pin 5. As it moves downwards, according to arrow F2, the pin 4 gets clear of its open bearing 19, comes in contact with the boss 74 of cam 7, causes the latter to be pivoted slightly in the direction of arrow F5 and strikes against the rear face of the hook 71. The resilient return of the cam 17 to its initial position, afforded by spring 63, brings the notch 73 onto pin 4, which locks the nose in position III, i.e. the maximum seat depth (FIG. 2c), while the back swivelling of the nose is prevented by means of the boss 74, serving as a stop for pin 4.

The nose returns to position I, once the mechanism is unlocked. For this purpose, the user pulls the front edge upwards once again, which causes the latter to turn about pin 5, as shown by arrow F3. Such swivelling motion brings the pin 4 to push the hook 71, which makes cam 7 pivot about its pin 18. The hook height is such that, following this swivelling motion, cam 7 goes beyond its unstable equilibrium position, imparted to it by spring 63 (aligning of pins 18, 72, 16). Thus the cam 7 is held in its second stable position, shown in FIG. 2d, releasing the pin 4 from the notch 73. On releasing the seat nose, the latter pivots first in the reverse direction (arrow F4) about pin 5, owing to the action of the moment exerted by spring 61, and the pin 4 is brought into its open bearing 19. Then the nose pivots on, now about said pin 4, under the action of the moment exerted by spring 62. As a result, the pin 5 moves in slot 17, contacts the rear part 75 of cam 7, forming the second leg of the U, and makes said cam pivot in the opposite direction to arrow F5, bringing it back to its first stable equilibrium position, as shown in FIG. 2a, thus permitting a new locking operation, on subsequent adjustments.

FIGS. 3a–3d show a second alternative embodiment of the seat nose swivelling and locking mechanism.

Figure 3:
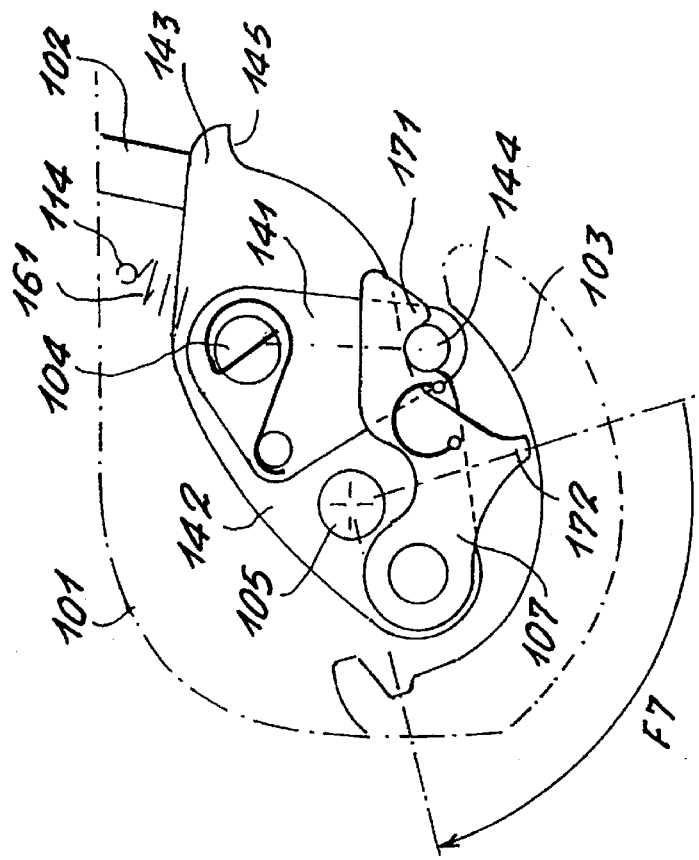
FIGS. 3a–3d similarly show a second alternative embodiment of this mechanism.
Figure 3:
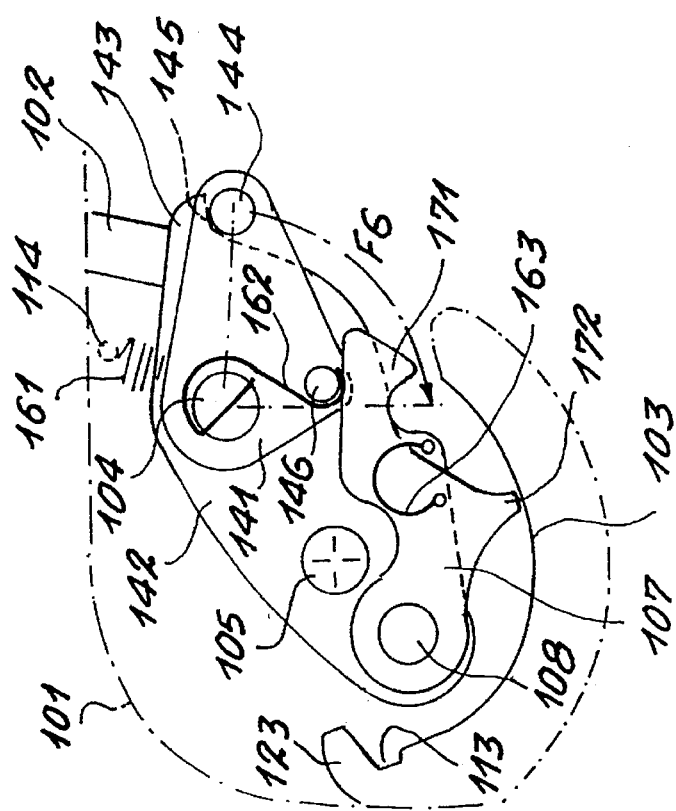

This mechanism comprises a flange 141 interlocking on the seat nose which, for clarity purposes, is not shown in these figures. Naturally, the various nose positions I, II, III hereinabove correspond to the respective positions of said flange 141, as shown in FIGS. 3a, 3b and 3c. This flange 141 is mounted pivotally on a first pin 104, integral with a plate 142, itself pivoted on a second pin 105 integral with a stationary support 101, connected to the frame of the seat 1.

A spring, for instance a tension spring 161, mounted be%ween said pin 104 and an anchoring point 114, fixed on the support 101, exerts on plate 142 a swivelling moment about pin 105, in the trigonometrical direction in the drawings, tending to keep an end 143 of said plate abutting against a stop 102 of support 101, as shown in FIGS. 3a and 3b.

The flange 141 bears a projecting part 144 cooperating with a shoulder 145 of plate 142 so as to limit the flange rotation, in the trigonometrical direction in the figures, in relation to the plate 142 and, in its lower part, a teat intended, as will be explained hereunder, to reset the locking system. Another spring, for example, a torsion spring 162, is mounted between said plate 142 and the flange 141, for instance connected to the pin 104 and resting on the teat 146, and it exerts on said flange a restoring moment, in the trigonometrical direction as well, and tending to keep the flange in an initial position, fixed in relation to the plate 142, since the projecting part 144 strikes against the shoulder 145.

Thus through the action of both springs 161 and 162, the flange 141, and therefore the seat nose connected to it, is kept in its initial position, shown in FIG. 3a, which corresponds to position I of the seat nose.

The plate 142 carries a latch 107 too, pivoted on a pin 108 on the opposite side of the end 143 with respect to pin 105. The latch 107 extends from pin 108 towards the flange 141 and it terminates in a downward facing hook 171, while its middle part comprises a locking cog 172, facing downwards too. An omega-shaped spring 163 is mounted between the latch 107 and the plate 142 and it forms, together with said latch, a bistable system. In position I of the seat nose (FIG. 3a), the spring 163 tends to induce the latch 107 to swivel downwards, the cog 172 striking against a curvilinear ramp 103, provided on support 101 and having the pin 105 as a center. This ramp 103 terminates, at the front part, in a setback 113, dimensioned so as to receive the cog 172, and followed by a shoulder 123 nearer to the pin 105.

The operation of this mechanism for the changeover of the seat nose from a position to another one and for locking it in every position will now be described.

From the first adjusting position I of the seat nose, corresponding to the mechanism position as described above and shown in FIG. 3a, the seat nose is brought to the intermediate position II when its front edge is pulled upwards. As a result, the seam nose 3 and the flange 141 swivel about pin 104, according to arrow F6, against the spring 162, and the projecting part 144 engages behind the hook 171 of latch 107, after having induced said latch to swivel slightly, so that the latter may return, after the engagement of the projecting part 144, to its first stable equilibrium position, as shown in FIG. 3b.

Another action on the seat nose to make it swivel brings this time both the plate 142 and the flange 141 to swivel about pin 105, as shown by arrow F7, against the restoring force exerted by spring 161. Therefore, the cog 172 of latch 107 moves on the ramp 103 and, at the end of the travel, it engages into the setback 113, under the action of spring 163, as shown in FIG. 3c. Consequently, the seat nose is locked in position III, affording the maximum seat depth.

Figure 3D:
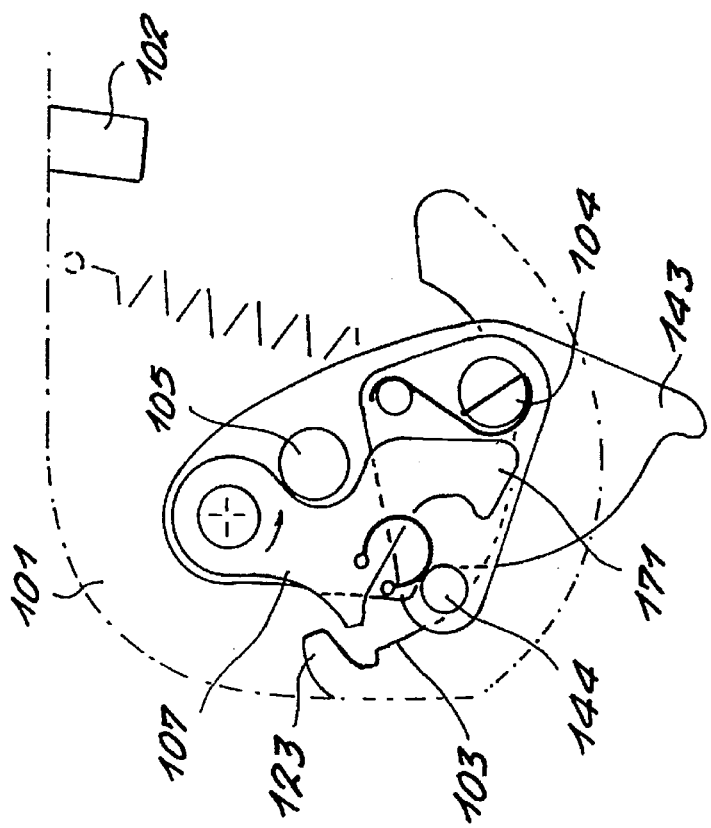
Figure 3C:
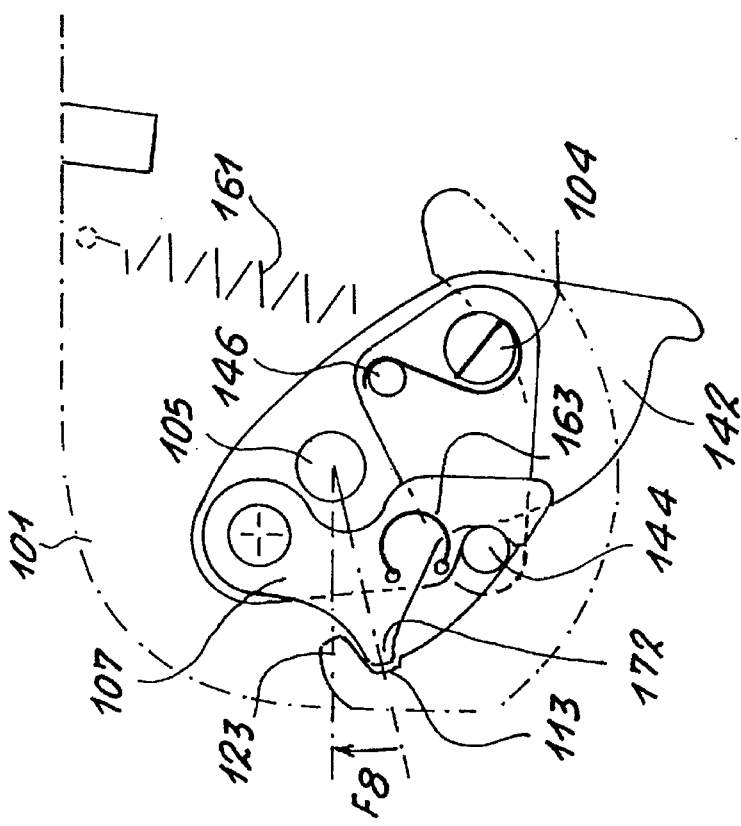

If the seat nose swivels on, as indicated by arrow F8, the cog 172 touches the shoulder 123, which pushes it back, while making the latch swivel to its second stable equilibrium position, as shown in FIG. 3d. As a result, the hook 171 releases the projecting part 144 of the flange 141, which for all that cannot swivel in relation to plate 142, due to the fact that said projecting part 144 is held back by the ramp 103. The seat nose being then freed, the plate 142 is returned by spring 161 and it swivels about pin 105 until its end 143 strikes against the stop 102. The mechanism is back to the position shown in FIG. 3b, except the latch 107, which is in its second stable position by now. The projecting part 144 is now beyond the rear end of ramp 103 and the flange 141 swivels, in the opposite direction of arrow F6, under the action of spring 162, until said projecting part strikes against the shoulder 145, the seat nose being back now to its first position I. In the course of this swivelling motion, the teat 146 of flange 141 is resting on the upper face of the hook 171 and rocks the latch 107 back to its first stable equilibrium position, as shown in FIG. 3a, thus permitting the locking of the system at the time of subsequent adjustments of the seat nose.

This invention is not limited to the embodiments herein shown and described, merely by way of example. More specifically, the locking and restoring mechanisms described in detail above may be altered or even replaced by functionally equivalent mechanisms.

What is claimed is:

1. A car seat having an adjustable front surface area, comprising:

a seat nose located forward of and swiveling with respect to a larger seat cushion, the nose having a generally polygonal cross section;

more than two successive sides of the nose forming surfaces having corresponding increasing lengths;

swiveling of the nose positioning a selected side of the nose upwards, in close proximity to the seat cushion to form a near continuous extension of a top surface of the cushion;

the nose swiveling about a plurality of parallel swivel axes as the nose assumes successive positions.

2. Seat according to claim 1, wherein the seat nose has a quadrilateral cross-section, the seat further comprising a first swivel axis about which the seat nose swivels between a first position and a second position, and a second swivel axis about which the nose swivels between said second position and a third position.

3. Seat according to claim 2, wherein both swivel axes are fixed in relation to the seat nose and movable in relation to the seat, during successive swivelling motions of the nose.

4. Seat according to claim 3, further wherein the seat comprises:

an open bearing for receiving a first pin through which passes said first axis, in said first and second positions of the seat nose, means for circularly guiding a second pin through which passes said second axis, the axis of said opening bearing being a center of rotation, and in which the second pin can move during nose rotation about the first pin and turn when the seat nose passes from its second to its third position, two return springs exerting on the nose restoring moments respectively about the pins so as to return the nose to its first position, a bistable locking system, comprising a swivelling cam and a third spring acting on said cam in order to keep the cam alternately in a first and in a second stable position, said cam being shaped for providing, in its first stable position, locking, in succession, of the second pin and then of the first pin in their positions when the seat nose is respectively in its second and then in its third adjusted position, and for permitting in succession the first and second pin to be unlocked.

5. Seat according to claim 2, wherein the first axis is fixed in relation to the seat nose and the second axis is fixed in relation to the seat.

6. Seat according to claim 5, further comprising:

a support connected to the seat and bearing a second pin through which passes said second axis, a plate swivelling about the second pin, and on which a first pin through which passes said first axis, is stationary, a flange integral with the seat nose and pivoting about said first pin, means for resiliently returning said flange to a stop of the plate, means for resiliently returning said plate to a stop of the support, a bistable locking system, having a latch hinged on said plate and a spring acting on said latch in order to keep the latch alternately in a first and in a second stable position, said latch being shaped so as to provide, in its first stable position, position locking of the flange in relation to the plate when the seat nose is in its second adjusted position, and then position locking of the plate in relation to the support when the nose is in its third position, and for permitting, in its second stable position, the plate and the flange to be successively unlocked.

7. Seat according to any one of claims 1, 2, 3, and 5 further comprising locking/unlocking means for automatically locking the seat nose in every one of its adjusting positions, the unlocking operation being carried out automatically by a further swivelling motion beyond a last adjusting position and permitting the seat nose to be returned to its first position.

8. Seat according to claim 7, wherein said locking/unlocking means further comprising a bistable system affording, in a first stable position, the locking of the seat nose in an adjusted position, and which is moved to a second stable position for cancelling said locking, on a further motion.

9. Seat according to claim 8, wherein said bistable system comprises means for its automatic return to its first stable position when the seat nose resumes a first adjusted position.

* * * * *